United States Patent [19] [11] 4,007,975
Schutz et al. [45] Feb. 15, 1977

[54] ARTICULATED BEARING

[75] Inventors: Karl-Heinz Schutz; Heinz Peter, both of Schweinfurt, Germany

[73] Assignee: SKF Industrial Trading and Development Company, B.V., Nieuwegein, Netherlands

[22] Filed: Feb. 2, 1976

[21] Appl. No.: 654,696

[30] Foreign Application Priority Data

Feb. 1, 1975    Germany ............... 7502998

[52] U.S. Cl. .................... 308/238; 308/72
[51] Int. Cl.[2] ...................... F16C 27/00
[58] Field of Search ........... 308/3 R, 36, 37, 58, 308/61, 72, 237 R, 238, 239

[56] References Cited

UNITED STATES PATENTS 3,602,560   8/1971   Mennel ............... 308/72 X
3,893,735   7/1975   Brenner .............. 308/72 X Primary Examiner—Philip Goodman
Assistant Examiner—Gene A. Church
Attorney, Agent, or Firm—Daniel M. Rosen

[57] ABSTRACT

An articulated bearing has an inner ring with a spherical outer surface, and an outer ring with a hollow spherical inner surface corresponding to and engaging the outer surface of the inner ring. Plastic bearing segments are circumferentially arranged in the cylindrical bore of the inner ring. The plastic segments are held by rings having inclined ends engaging the ends of the plastic segments. Circumferential displacement of the segments is prevented by strips affixed in the bore of the inner ring between adjacent segments. The plastic segments extend radially inwardly of the holding rings and strips a distance, in the absence of loading of the bearing, corresponding to the elastic deformation of the segments in the loaded condition. A pin in one of the inner and outer rings is urged into a recess in the other of the inner and outer rings, by means of a spring.

14 Claims, 3 Drawing Figures

ARTICULATED BEARING

THE INVENTION

This invention relates to articulated bearings, and more particularly to an articulated bearing having an inner ring with a layer of a plastic sliding material in its inner bore, and an outer ring articulated to the inner ring. The articulation of the inner and outer rings may be effected by providing a spherical outer surface of the inner ring, the outer ring having an inner surface of corresponding shape engaging the inner ring.

Articulated bearings of this type are known, wherein the bore of the inner ring is lined with a sliding bearing layer, for example, of a plastic material. In such bearings the plastic layer constitutes the sole bearing surface, and as a consequence such bearings have a proportionally minimum load capacity, since the loads are applied to the bearing sole on the relatively weak plastic material.

Articulated bearings of the above type are further known, wherein relative turning movement between the inner and outer rings, in the circumferential direction of the rings, is inhibited by a pin extending between the inner and outer rings. This arrangement has the disadvantage that, in the event the inner ring becomes locked to a shaft or slide housing in the bore, for example due to locking of the sliding or roller bearings, fuctioning of the bearing is entirely prevented.

The present invention is therefore directed to the provision of an articulated bearing having a high load capacity, and wherein fuctioning of the bearing is possible, without destruction of the bearing, even in the event of locking of the bearing surface of the inner ring to a running member engaging the bearing surface of the inner ring.

Briefly stated, in accordance with the invention, an articulated bearing of the above type is provided in which the slide bearing layer in the bore of the inner ring is comprised of a plurality of circumferentially arranged individual slide segments or inserts. In order to hold the slide inserts in position in the axial direction, ring means are provided at the axial ends of the inserts, the ring means being affixed to the inner ring and having inclined surfaces engaging the axial ends of the inserts. In addition, one or more strips are affixed in the bore of the inner ring, between adjacent plastic inserts, in order to inhibit circumferential movement of the plastic inserts in the bore. The plastic inserts extend radially inwardly of the holding ring means and the strips a distance, in the unloaded condition, corresponding to the elastic deformation of the plastic inserts in the loaded condition. As a consequence, in the loaded condition of the bearings, the full load is not applied to the plastic inserts.

According to a further feature of the invention, a recess is provided in the spherical surface of the inner or outer ring, and a pin radially movable in a radial bore of the other of the inner and outer rings is resiliently urged into the recess by means of a spring. The engagement of the pin and recess limits the relative tilt or adjustment between the inner and outer rings, while inhibiting relative rotation of the inner and outer rings about the axis of the inner ring except in the event of locking of the inner ring to the shaft or inner bearing housing.

In order that the invention will be more clearly understood, it will now be disclosed in greater detail with reference to the accompanying drawings, wherein.

Figure 1:
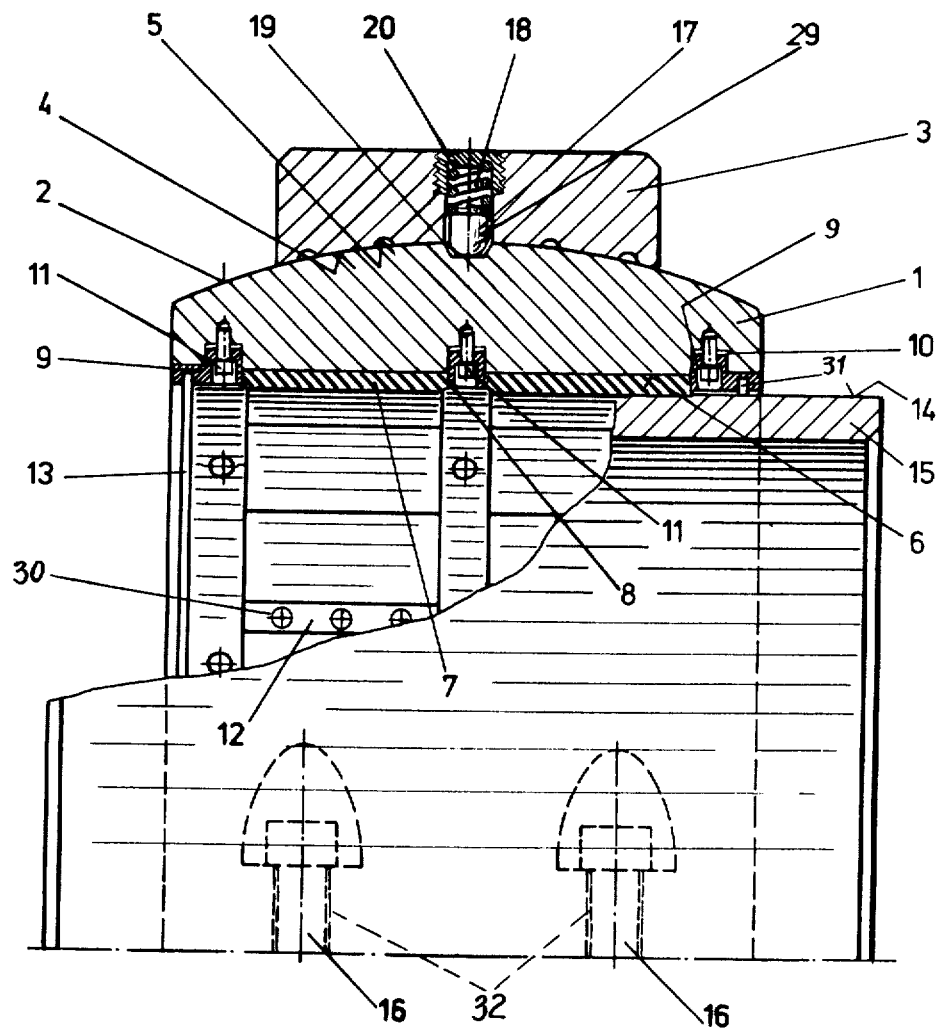
FIG. 1 is a cross-sectional view of an articulated bearing in accordance with one embodiment of the invention, on one side of the axis thereof.

Referring now to the drawings, and more in particular to FIG. 1, therein is illustrated a cross-sectional view of an articulated bearing in accordance with the invention, above the axis thereof. It will, of course, be understood that the portion of the bearing below the axis appears substantially the same, with the exception that the pin 17 and recess 19, and the elements cooperating therewith may not be provided in the lower portion of the bearing.

The articulated bearing is comprised of an inner ring 1 having a cylindrical bore 6, and a spherical outer surface 2. In other words, the outer surface of the inner ring defines the arc of a circle in any plane extending through the center of the ring. An outer ring 3 has a hollow spherical inner surface 4 corresponding to the outer surface of the ring 1. The ring 3 is mounted with its inner surface engaging the outer spherical surface of the ring 1. Annular lubricating grooves 5 are provided in the inner surface 4, coaxial with the ring 3, for lubricating the surfaces 2 and 4. The mating surfaces 2 and 4 thus form mating bearing surfaces for articulated movement between the inner and outer rings.

A plurality of plastic slide segments or inserts 7 are provided in the bore of the inner ring. As illustrated in FIG. 1, the inserts 7 extend axially of the inner ring 1 and are arranged circumferentially against the cylindrical bore 6 in two axially spaced apart rows. The inserts 7 have side edges extending axially of the inner ring, and are curved to fit against the bore of the inner ring. The axial ends of the inserts 7 are inclined, so that their axial length decreases radially inwardly. In order to hold the inserts in the radial and axial directions, a plurality of preferably bronze rings 8 and 9 are affixed to the inner ring 1 in the bore 6. As illustrated in FIG. 1, the axially outer inner rings 9 have inclined surfaces toward the adjacent inserts 7 and engaging the axial ends of these inserts, and the ring 8 is provided between these two rows of inserts and has inclined surfaces on each side engaging the inclined end surfaces of the two rows of inserts. It will be apparent, of course, that less or more rows of inserts 7 may be provided, and that when only one row of inserts is provided a ring of the type of ring 8 is omitted, while when two or more rows of inserts are provided, an intermediate ring of the type of the ring 8 is provided between each pair of adjacent rows of inserts. The rings 8 and 9 are fitted into annular grooves 10 in the surfaces of the bore 6, and are held therein by conventional means such as screws 11.

As will be discussed in the following paragraphs, in order to facilitate assembly of the bearing, the rings 1 and 3 may be formed of a plurality of sections, and the rings 8, 9 may hence also be formed of a plurality of sections. The rings 8, 9 may thus be said to be "wedge" rings, since their inclined surfaces wedge the inserts 7 against the surface of the bore, to hold the inserts firmly in position axially and radially.

In order to inhibit circumferential movement of the inserts 7, one or more axially extending bronze strips 12 may be provided in the bore 6 in each row of inserts between a pair of adjacent inserts. If a plurality of such strips 12 is provided, they are distributed preferably equally about the circumference of the bore. The strips 12 are affixed to the inner ring by conventional means, such as screws 30.

A ring-shaped bearing housing 15, which may be shrunk onto a shaft (not shown) is provided in the bore 6, the outer surface 14 of the bearing housing 15 engaging the plastic inserts 7. Annular grooves 13 may be provided in the rings 9, for holding suitable sealing rings 31. The sealing rings extend radially inwardly to engage the surface 14 for slidably sealing the bearing. It will, of course, be understood that another bearing member, such as a shaft or a journal, may be employed although the arrangement illustrated in FIG. 1 provides a convenient unitary bearing assembly. The sealing rings 31 may, of course, be in the form of split rings of conventional sealing material.

The inserts 7 have thicknesses whereby, in the unloaded condition of the bearing, they extend radially inwardly of the rings 8, 9 a distance corresponding to the elastic deformation of the plastic material under load. In other words, in the absence of loading of the inserts by engagement with the housing 15, the inserts project radially inwardly of the rings 8, 9 and strips 12. When the housing 15 is in position, however, the plastic of the inserts 7 is elastically deformed, so that the surface 14 of the housing 15 slidably engages the rings 8, 9 and the strips 12.

As a result, the bronze rings 8, 9 and bronze strips 12 wear to the same extent as the bearing inserts 7 during the life of the bearing, and it is insured that a complete fitting of the inserts 7 over their respective radial thicknesses results during the service life of the bearing.

The arrangement in accordance with the invention also enables the ready assembly and disassembly of the bearing surfaces, so that the plastic inserts 7 may be replaced when necessary, and that the inserts may be individually replaced.

As discussed above, the inner ring 1 and the outer ring 3 are each divided in the axial direction, i,e., along axial planes, to facilitate assembly of the bearing. The figure illustrates the screws 16 provided in apertures 32 of the inner ring for holding the two halves of the inner ring together. A similar arrangement is provided for holding the portions of the outer ring together.

In a normal operation, rotational movements of the bearing structure above the axis of the inner ring 1, and axial movement of the bearing structure occurs only between the bearing housing 15 and the inserts 7, while relative tilting and adjustment movements in the bearing only occur between the inner ring 1 and the outer ring 3. In order to inhibit relative rotation between the inner ring 1 and the outer ring 3, a recess 19 is provided in the outer surface 2 of the inner ring 1, and a pin 17, extending radially in a bore 29 of the outer ring, is resiliently urged into the recess 19 by means of a spring 18. The spring 18 may be held in position by means of a screw cap 20 threaded in the bore or in an enlarged end of the bore 29. The force of the spring 18 may be thereby adjusted by means of the screw cap 20.

The recess 19 in the inner ring 1 is so formed that a determined relative tilting or adjustment movement between the bearing rings 1 and 3 is possible, while relative turning movement between these rings is hindered. In the event of locking of the bearing, for example, the locking of the inner ring to the housing 15, the pin 17 is forced or pressed out of the recess 19, so that relative turning can occur between the inner ring and outer ring. As a consequence, in the event of such locking of the bearing, turning movement in the bearing can still occur in emergency situations, without resulting in destruction of the bearing. In the arrangement illustrated in FIG. 1, the end of the pin 17 in the recess 19 is rounded, and the sides of the recess 19 in the axial direction of the bearing are slightly inclined. The sides of the recess 19 in the circumferential direction are closely adjacent for engaging the pin 17, and are shaped to normally inhibit relative turning of the bearing rings 1 and 3, while permitting such turning only in emergency situations such as the locking of the bearing.

Figure 2:
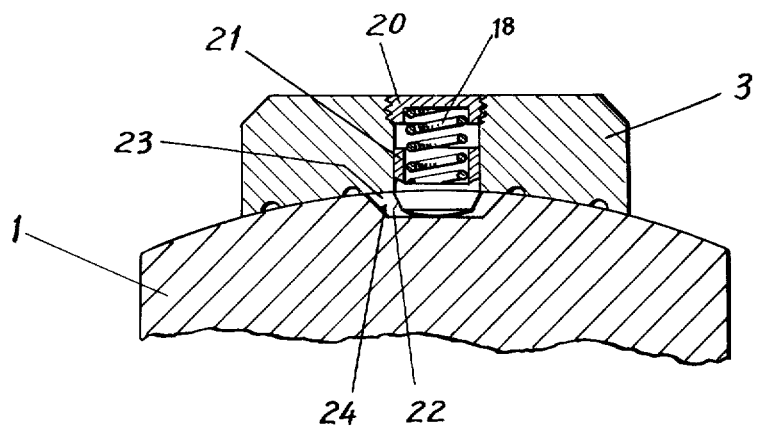
FIG. 2 is an enlarged cross-sectional view of a modification of a portion of the articulated bearing of FIG. 1.

The bearing structure illustrated in FIG. 2 differs from that of FIG. 1 only in the form of the pin and the recess. In this arrangement, the sides of the end of the pin 21 in the recess 23 are beveled, as indicated at 22, and the side surfaces 24 of the recess are also beveled. The width of the recess 23, in the axial direction of the bearing, is greater than the diameter of the pin 21, so that a determined tilting or adjustment movement between the rings 1 and 3 is possible without forcing the pin out of the recess.

Figure 3:
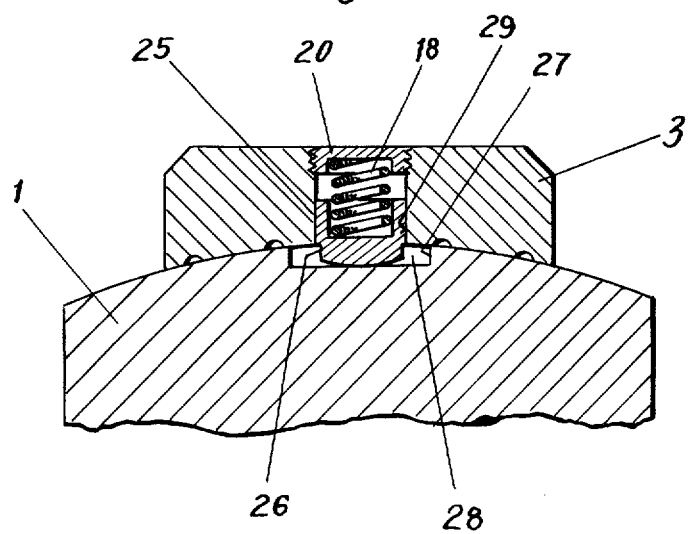
FIG. 3 is an enlarged cross-sectional view of a portion of a further modification of the articulated bearing of FIG. 1.

The arrangement of FIG. 3 also differs from the arrangement of FIG. 1 only in the shapes of the end of the pin and the recess. In this arrangement, the diametrically opposite sides of the pin 25, i.e., the sides which are opposite each other in the axial direction of the bearing, extend radially of the bearing. The sides 27 on opposite sides of the recess 28 in the axial direction of the bearing also extend radially of the bearing, and the width of the recess 28 in this direction is greater than the diameter of the end of the pin 25 engaging the recess. As a consequence, the rings 1 and 3 may be relatively tilted and adjusted during normal operation a distance determined by the width of the recess 28, and the pin cannot be forced out of the recess in such tilting or adjusting movements under normal conditions.

While the invention has been disclosed and described with reference to a limited number of embodiments, it will be apparent that variations and modifications may be made therein. For example, it is apparent that the pins for inhibiting relative turning movement of the bearing rings 1 and 3 may be provided in the inner ring 1, with the mating recesses being provided in the outer ring. It is intended in the following claims to cover each such variation and modification as falls within the true spirit and scope of the invention.

What is claimed is:

1. In an articulted bearing having an inner ring with a spherical outer surface, an outer ring with a hollow spherical inner surface corresponding to and engagement with the outer surface of the inner ring, and a sliding bearing surface in the inner cylindrical bore of the inner ring; the improvement wherein said sliding bearing surface comprises a plurality of plastic inserts arranged about the circumference of said bore, ring means adjacent to the inner ring at the axial ends of said inserts, said ring means having inclined surfaces engaged in the axial ends of said inserts for holding said inserts in said bore, and strip means affixed to said inner ring in said bore between at least one pair of circumferentially adjacent inserts for inhibiting circumferential movement of said inserts in said bore, said inserts extending radially inwardly with respect to said ring means and strip means, in the unloaded condition of the bearing, a distance corresponding to the elastic deformation of said inserts under load.

2. The articulated bearing of claim 1, wherein said ring means comprises wedge ring segments.

3. The articulated bearing of claim 1, wherein a recess is provided in the surface of one of said inner and outer rings toward the other of said inner and outer rings, and a pin is provided in the other of said inner and outer rings and extending into said recess for limiting the tilting or adjusting movement between said inner and outer rings.

4. The articulated bearing of claim 1, wherein a radially extending bore is provided in one of said inner and outer rings, a recess is provided in the surface of the other of said inner and outer rings toward said one of said inner and outer rings, a pin is slidably mounted for radial movement of said bearing and said last-mentioned bore, and a spring is mounted in said last-mentioned bore for urging said pin resiliently into said recess.

5. The articulated bearing of claim 4, wherein the end of said pin in said recess has inclined surfaces axially of said bearing.

6. The articulated bearing of claim 5, wherein said recess has inclined side surfaces close to the inclined side surfaces of said pin.

7. The articulated bearing of claim 5, wherein said recess has curved side surfaces adjacent said inclined surfaces of said pin.

8. The articulated bearing of claim 5, wherein said pin has curved surfaces on the portion thereof in said recess.

9. The articulated bearing of claim 8, wherein said recess has inclined surfaces closely adjacent said curved surfaces of said pin.

10. The articulated bearing of claim 8, wherein said recess has curved side surfaces closely adjacent said curved surfaces of said pin.

11. The articulated bearing of claim 5, wherein the dimension of said recess in the axial direction of said bearing is greater than the diameter of said pin in said recess, and the dimension of said recess in the circumferential direction of said bearing is substantially equal to the diameter of said pin.

12. The articulated bearing of claim 5, wherein said pin has diametrically opposite radially extending side surfaces in said recess, in the axial direction of said bearing, and said recess has radially extending side surfaces axially aligned with said side surfaces of said pin, the width of said recess in the axial direction of said bearing being greater than the dimension of said pin in the axial direction of said bearing in said recess.

13. In a bearing having a ring with a cylindrical inner bore, and a sliding bearing surface in said bore, the improvement wherein said sliding bearing surface comprises a plurality of plastic inserts arranged about the circumference of said bore, ring means affixed to said ring at the axial ends of said inserts, said ring means having inclined surfaces engaging said inserts for holding said inserts in said bore, and strip means affixed to said inner ring in said bore between at least one pair of circumferentially adjacent inserts for inhibiting circumferential movement of said inserts in said bore, said inserts extending radially inwardly, with respect to said ring means and said strip means, in the unloaded condition of said bearing, a distance corresponding to the elastic deformation of said inserts under load.

14. In an articulated bearing having an inner ring with a spherical outer surface, an outer ring with a hollow spherical inner surface corresponding to and in engagement with the outer surface of the inner ring, and a sliding bearing surface in the inner cylindrical bore of said inner ring, the improvement comprising a recess in the surface of one of said inner and outer rings toward the other of said inner and outer rings, a radially extending bore in the other of said inner and outer rings, a pin slidably radially movable in said radially extending bore, and spring means in said radially extending bore mounted to urge said pin into said recess for normally inhibiting relative turning between said outer and inner rings with respect to the axis of said inner ring.

* * * * *